:::
United States Patent [19]

Berg et al.

[11] Patent Number: 5,636,413
[45] Date of Patent: Jun. 10, 1997

[54] DIVER'S QUICK RELEASE TETHER LINE CLIP

[76] Inventors: Daniel T. Berg, 2745 Cheshire Dr., Baldwin, N.Y. 11510; Hank Garvin, 93 N. Middle Town Rd., Pearl River, N.Y. 10965

[21] Appl. No.: 574,638

[22] Filed: Dec. 19, 1995

[51] Int. Cl.$^6$ .................................................. F16G 11/00
[52] U.S. Cl. ........................................ 24/131 R; 24/129 C
[58] Field of Search .................................. 132/280, 284; 43/43.12; 24/131 R, 131 C, 129 C, 546, 3.6, 343

[56] References Cited

U.S. PATENT DOCUMENTS

| 533,385 | 1/1895 | Tweedale | 24/3.6 X |
|---|---|---|---|
| 1,525,907 | 2/1925 | Batlle | 24/3.6 |
| 2,161,637 | 6/1939 | Raphael | 24/131 R |
| 2,564,260 | 8/1951 | Houser | 24/131 X |
| 3,740,803 | 6/1973 | Arteburn | 43/43.12 X |
| 4,413,381 | 11/1983 | Fidock | 24/131 C |

FOREIGN PATENT DOCUMENTS

| 420384 | 4/1947 | Italy | 132/284 |
|---|---|---|---|

Primary Examiner—James R. Brittain
Attorney, Agent, or Firm—Richard L. Miller, P.E.

[57] ABSTRACT

A Jon Line clip that includes an elongated slender cylindrical shaft portion, a cylindrical coil portion, a smooth semi-circular portion, and a serpentine retaining portion. The elongated slender cylindrical shaft portion has a proximal end, a distal end, a diameter, and a longitudinal axis. The cylindrical coil portion lies in a plane and is made from an elongated slender rod material that has a diameter. The cylindrical coil portion extends smoothly from the proximal end of the elongated slender cylindrical shaft portion and perpendicularly upwardly from the longitudinal axis of the elongated slender cylindrical shaft portion, so that a Jon line can be secured therethrough. The smooth semi-circular portion lies in a plane and is made from an elongated slender rod material having a diameter. The smooth semi-circular portion extends smoothly from the distal end of the elongated slender cylindrical shaft portion. The serpentine retaining portion lies in a plane and is made from an elongated slender rod material having a diameter. And, the serpentine retaining portion extends smoothly outwardly from the smooth semi-circular portion and together with the smooth semi-circular portion and the elongated slender cylindrical shaft portion defining a retaining chamber, so that a anchor line of a boat can be removably secured therein.

15 Claims, 2 Drawing Sheets

:::

DIVER'S QUICK RELEASE TETHER LINE CLIP

BACKGROUND OF THE INVENTION

The present invention relates to a diver's tether line clip. More particularly, the present invention relates to a diver's tether lines clip that includes an elongated slender cylindrical shaft portion, a cylindrical coil portion, a smooth semi-circular portion, and a serpentine retaining portion.

Diver's tether were developed by divers as a method of maintaining depth and position while decompressing. Anyone who has ever tried to stay at a constant depth while holding onto the dive boat's anchor rope in a heavy sea knows it is no easy task.

Most diver's tether lines are home made. They are normally short 4 to 6 foot lengths of ¼ inch nylon line with a spliced loop at both ends.

The diver's tether line is hooked up by wrapping the line around the boat's anchor line at the desired depth. One end of the line is then slipped through the other braided loop and then pulled snug. The diver holds onto the loop of the loose end. Any movement in the anchor, due to surge or heavy seas, no longer pulls the diver out of position. The diver's tether line pivots up and down while the diver maintains a constant depth through neutral buoyancy.

The diver's tether also helps in a current situation since the loose end can be snapped onto to a diver's harness, therefore greatly reducing arm fatigue.

Numerous innovations for diver's tether line have been provided in the prior art that will be described. Even though these innovations may be suitable for the specific individual purposes to which they address, however, they differ from the present invention in that they require both hands to hook up. This creates a problem since many divers carry cameras, tools, or in heavy seas need one hand just to hold on.

SUMMARY OF THE INVENTION

ACCORDINGLY, AN OBJECT of the present invention is to provide a clip that avoids the disadvantages of the prior art.

ANOTHER OBJECT of the present invention is to provide a diver's tether line clip that is simple and inexpensive to manufacture.

STILL ANOTHER OBJECT of the present invention is to provide a diver's tether line clip that is simple to use.

YET ANOTHER OBJECT of the present invention is to provide a diver's tether line clip that allows a diver to attach his/her diver's tether line to any size anchor line ranging from ½ inch to 1½ inches.

STILL YET ANOTHER OBJECT of the present invention is to provide a diver's tether line clip that requires only one hand for deployment.

YET STILL ANOTHER OBJECT of the present invention is to provide a diver's tether line clip that has a compact wedge design that attaches to the anchor line and holds position establishing decompression or safety decompression hang depth.

STILL YET ANOTHER OBJECT of the present invention is to provide a diver's tether line clip that when decompression or safety decompression hang is complete, it can be quickly and easily removed.

YET STILL ANOTHER OBJECT of the present invention is to provide a diver's tether line clip that is compact in size and allows for easy storage.

BRIEFLY STATED, STILL YET ANOTHER OBJECT of the present invention is to provide a clip that includes an elongated slender cylindrical shaft portion, a cylindrical coil portion, a smooth semi-circular portion, and a serpentine retaining portion.

YET STILL ANOTHER OBJECT of the present invention is to provide a diver's tether clip wherein the elongated slender cylindrical shaft portion has a proximal end, a distal end, a diameter, and a longitudinal axis.

STILL YET ANOTHER OBJECT of the present invention is to provide a diver's tether line clip wherein the cylindrical coil portion lies in a plane and is made from an elongated slender rod material that has a diameter.

YET STILL ANOTHER OBJECT of the present invention is to provide a diver's tether line clip wherein the cylindrical coil portion extends smoothly from the proximal end of the elongated slender cylindrical shaft portion and perpendicularly upwardly from the longitudinal axis of the elongated slender cylindrical shaft portion, so that a diver's tether line can be secured therethrough.

STILL YET ANOTHER OBJECT of the present invention is to provide a diver's tether line clip wherein the smooth semi-circular portion lies in a plane and is made from an elongated slender rod material having a diameter.

YET STILL ANOTHER OBJECT of the present invention is to provide a diver's tether line clip wherein the smooth semi-circular portion extends smoothly from the distal end of the elongated slender cylindrical shaft portion.

STILL YET ANOTHER OBJECT of the present invention is to provide a diver's tether line clip wherein the serpentine retaining portion lies in a plane and is made from an elongated slender rod material having a diameter.

YET STILL ANOTHER OBJECT of the present invention is to provide a diver's tether line clip wherein the serpentine retaining portion extends smoothly outwardly from the smooth semi-circular portion and together with the smooth semi-circular portion and the elongated slender cylindrical shaft portion defining a retaining chamber, so that a anchor line of a boat can be removably secured therein.

STILL YET ANOTHER OBJECT of the present invention is to provide a diver's tether line clip wherein the elongated slender cylindrical shaft portion is spring stainless steel, so that the elongated slender cylindrical shaft portion is resilient and will not corrode in sea water.

YET STILL ANOTHER OBJECT of the present invention is to provide a diver's tether line clip wherein the cylindrical coil portion includes at least two concentric loops.

STILL YET ANOTHER OBJECT of the present invention is to provide a diver's tether line clip wherein the cylindrical coil portion is spring stainless steel, so that the cylindrical coil portion is resilient and will not corrode in sea water.

YET STILL ANOTHER OBJECT of the present invention is to provide a diver's tether line clip wherein the diameter of the material of the cylindrical coil portion is equal to the diameter of the elongated slender cylindrical shaft portion.

STILL YET ANOTHER OBJECT of the present invention is to provide a diver's tether line clip wherein the cylindrical coil portion is integrally formed with the elongated slender cylindrical shaft portion.

YET STILL ANOTHER OBJECT of the present invention is to provide a diver's tether line clip wherein the smooth semi-circular portion is spring stainless steel, so that the smooth semi-circular portion is resilient and will not corrode in sea water.

STILL YET ANOTHER OBJECT of the present invention is to provide a diver's tether line clip wherein the diameter of the material of the smooth semi-circular portion is equal to the diameter of the elongated slender cylindrical shaft portion.

YET STILL ANOTHER OBJECT of the present invention is to provide a diver's tether line clip wherein the smooth semi-circular portion is integrally formed with the elongated slender cylindrical shaft portion.

STILL YET ANOTHER OBJECT of the present invention is to provide a clip wherein the plane of the smooth semi-circular portion is perpendicular to the plane of the cylindrical coil portion.

YET STILL ANOTHER OBJECT of the present invention is to provide a diver's tether line clip wherein the serpentine retaining portion has a plurality of alternating hills and valleys, so that the plurality of hills of the serpentine retaining portion compress the anchor line of the boat and facilitate securing thereto.

STILL YET ANOTHER OBJECT of the present invention is to provide a diver's tether line clip wherein the serpentine retaining portion is spring stainless steel, so that the serpentine retaining portion is resilient and will not corrode in sea water.

YET STILL ANOTHER OBJECT of the present invention is to provide a diver's tether line clip wherein the diameter of the material of the serpentine retaining portion is equal to the diameter of the elongated slender cylindrical shaft portion.

STILL YET ANOTHER OBJECT of the present invention is to provide a diver's tether line clip wherein the serpentine retaining portion is integrally formed with the smooth semi-circular portion.

YET STILL ANOTHER OBJECT of the present invention is to provide a diver's tether line clip wherein the plane of the serpentine retaining portion is perpendicular to the plane of the cylindrical coil portion.

STILL YET ANOTHER OBJECT of the present invention is to provide a diver's tether line clip that further includes an elongated slender cylindrical guiding portion that lies in a plane and has diameter.

YET STILL ANOTHER OBJECT of the present invention is to provide a diver's tether line clip wherein the elongated slender cylindrical guiding portion extends smoothly outwardly at a skewed angle from the serpentine retaining portion, so that the anchor line of the boat can be guided into the retaining chamber.

STILL YET ANOTHER OBJECT of the present invention is to provide a diver's tether line clip wherein the elongated slender cylindrical guiding portion is spring stainless steel, so that the elongated slender cylindrical guiding portion is resilient and will not corrode in sea water.

YET STILL ANOTHER OBJECT of the present invention is to provide a diver's tether line clip wherein the diameter of the elongated slender cylindrical guiding portion is equal to the diameter of the elongated slender cylindrical shaft portion.

STILL YET ANOTHER OBJECT of the present invention is to provide a Jon Line clip wherein the elongated slender cylindrical guiding portion is integrally formed with the serpentine retaining portion.

FINALLY, YET STILL ANOTHER OBJECT of the present invention is to provide a diver's tether line clip wherein the plane of the elongated slender cylindrical guiding portion is perpendicular to the plane of the cylindrical coil portion.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

Figure 1:
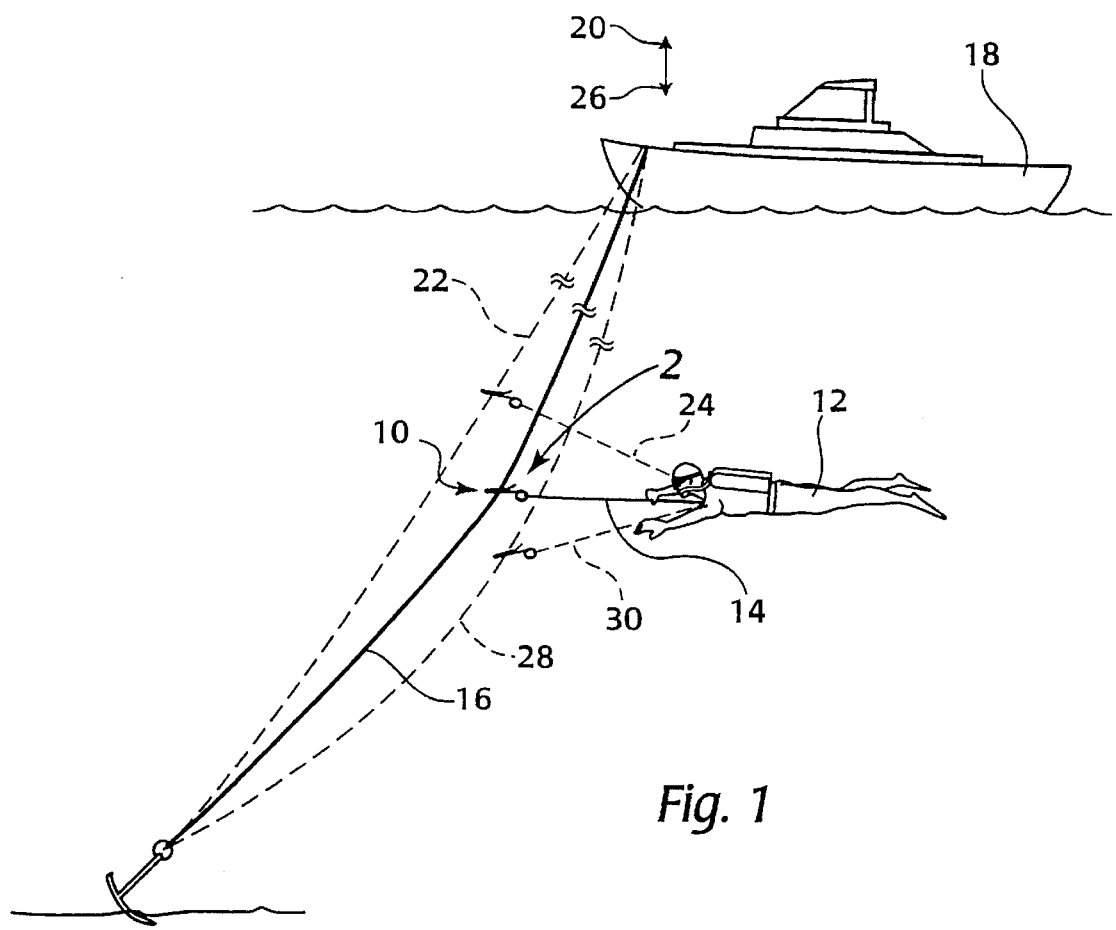
FIG. 1 is a diagrammatic view illustrating the present invention being utilized by a diver.

LIST OF REFERENCE NUMERALS UTILIZED IN THE DRAWING diver's tether line clip of the present invention
diver
diver's tether line
boat anchor line
boat
boat movement up arrow
boat anchor line boat movement up position
diver's tether line boat movement up position
boat movement down arrow
boat anchor line boat movement down position
diver's tether line boat movement down position
elongated slender cylindrical shaft portion
elongated slender cylindrical shaft portion proximal end
elongated slender cylindrical shaft portion distal end
elongated slender cylindrical shaft portion diameter
cylindrical coil portion
at least two cylindrical coil portion loops
smooth semi-circular portion
serpentine retaining portion
plurality of alternating serpentine retaining portion smooth hills
plurality of alternating serpentine retaining portion smooth valleys
retaining chamber
elongated slender cylindrical guiding portion

DETAILED DESCRIPTION OF THE PREFERRED EMBODIMENT

Referring now to the figures in which like numerals indicate like parts, and particularly to FIG. 1, the diver's tether line clip of the present invention is shown generally at 10 removably holding a diver 12, via a diver's tether line 14, to a desired depth interval on a boat anchor line 16 of a boat 18.

As the boat 18 moves up, as indicated by a boat movement up arrow 20, the boat anchor line 16 of the boat 18 assumes a boat anchor line boat movement up position 22 and the diver's tether line 14 assumes a diver's tether line boat movement up position 24. Due to the natural buoyancy of the diver 12, however, the diver 12 stays at the desired depth interval on the boat anchor line 16 of the boat 18.

As the boat 18 moves down, as indicated by a boat movement down arrow 26, the boat anchor line 16 of the boat 18 assumes a boat anchor line boat movement down position 28 and the diver's tether line 14 assumes a diver's tether line boat movement down position 30. Due to the natural buoyancy of the diver 12, however, the diver 12 stays at the desired depth interval on the boat anchor line 16 of the boat 18.

Figure 2:
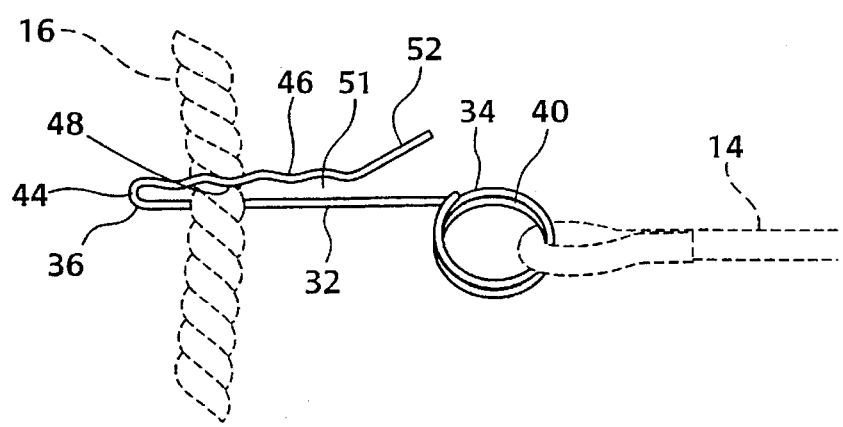
FIG. 2 is an enlarged diagrammatic perspective view of the present invention as indicated by arrow 2 in FIG. 1.
Figure 3:
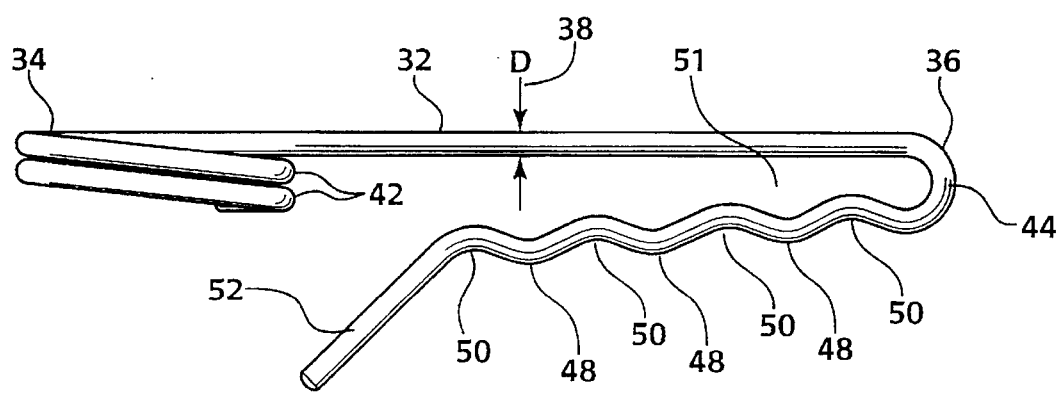
FIG. 3 is a diagrammatic top plan view of the present invention.
Figure 4:
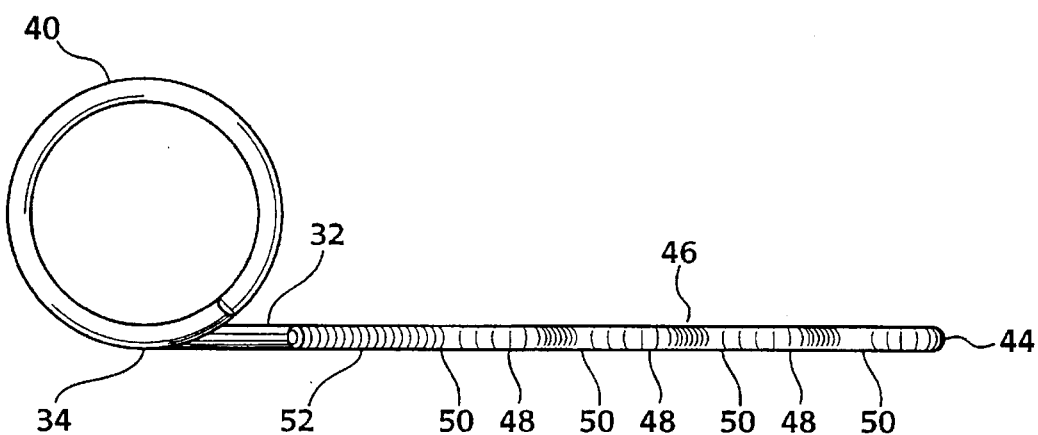
FIG. 4 is a diagrammatic side elevational view of the present invention.

The configuration of the diver's tether line clip 10 can best be seen in FIGS. 2–4, and as such, will be discussed with reference thereto.

The diver's tether line clip 10 includes an elongated slender cylindrical shaft portion 32 that has an elongated slender cylindrical shaft portion proximal end 34, an elongated slender cylindrical shaft portion distal end 36 and an elongated slender cylindrical shaft portion diameter 38. The elongated slender cylindrical shaft portion 32 is a spring material that may be spring stainless steel, but is not limited to that.

A cylindrical coil portion 40 having at least two cylindrical coil portion loops 42 and made from an elongated slender rod material that has a diameter equal to the elongated slender cylindrical shaft portion diameter 38 of the elongated slender cylindrical shaft portion 32 extends smoothly from, and is integrally formed with, the elongated slender cylindrical shaft portion proximal end 34 of the elongated slender cylindrical shaft portion 32.

The cylindrical coil portion 40 extends perpendicularly upwardly from the longitudinal axis of the elongated slender cylindrical shaft portion 32 and is a spring material that may be spring stainless steel, but is not limited to that.

A smooth semi-circular portion 44 made from an elongated slender rod material that has a diameter equal to the elongated slender cylindrical shaft potion diameter 38 of the elongated slender cylindrical shaft portion 32 extends smoothly from, and is integrally formed with, the elongated slender cylindrical shaft portion distal end 36 of the elongated slender cylindrical shaft portion 32.

The smooth semi-circular portion 44 lies in a plane that is perpendicular to the plane of the cylindrical coil portion 40 and is a spring material that may be spring stainless steel, but is not limited to that.

A serpentine retaining portion 46 has a plurality of alternating serpentine retaining portion smooth hills 48 and a plurality of alternating serpentine retaining portion smooth valleys 50. The serpentine retaining portion 46 is made from an elongated slender rod material that has a diameter equal to the elongated slender cylindrical shaft potion diameter 38 of the elongated slender cylindrical shaft portion 32 and extends smoothly outwardly from, and is integrally formed with, the smooth semi-circular portion 44.

The serpentine retaining portion 46 lies in a plane that is the same plane as the smooth semi-circular portion 44 and is a spring material that may be spring stainless steel, but is not limited to that.

The elongated slender cylindrical shaft portion 32 with the smooth semi-circular portion 44 and the serpentine retaining portion 46 together define a retaining chamber 51.

An elongated slender cylindrical guiding portion 52 has a diameter equal to the elongated slender cylindrical shaft portion diameter 38 of the elongated slender cylindrical shaft portion 32 extends smoothly outwardly at a skewed angle from, and is integrally formed with, the serpentine retaining portion 46.

The elongated slender cylindrical guiding portion 52 lies in a plane that is the same plane as the serpentine retaining portion 46 and is a spring material that may be spring stainless steel, but is not limited to that.

The operation of the diver's tether line clip 10 can best be seen in FIGS. 1 and 2, and as such, will be discussed with reference thereto.

An end of the diver's tether line 14 is passed through the cylindrical coil portion 40 of the Jon Line clip 10 and is affixed to itself and forming a pivotally connection with the cylindrical coil portion 40.

As the diver 12 rises and decompresses, the diver 12 stops at the desired depth interval, and using only one hand, positions the diver's tether line clip 10 so as to cause the boat anchor line 16 of the boat 18 to be guided by the elongated slender cylindrical guiding portion 52 of the diver's tether line clip 10 and enter the retaining chamber 51 of the diver's tether line clip 10 where it is readily removably retained between the plurality of alternating serpentine retaining portion smooth valleys 50 of the serpentine retaining portion 46 and the elongated slender cylindrical shaft portion 32 due to the spring of the material of the diver's tether line clip 10.

Due to the natural buoyancy of the diver 12, however, the diver 12 stays at the desired depth interval on the boat anchor line 16 of the boat 18 even though the boat 18 moves up and down.

As the diver 12 desires to rise and continue to decompress, the diver 12, using only one hand, manipulates the diver's tether line clip 10 so as to cause the boat anchor line 16 of the boat 18 to be readily removed from the retaining chamber 51 of the diver's tether line clip 10.

As the diver 12 rises and continues to decompress, the diver 12 stops at the next desired depth interval, and using only one hand, again positions the diver's tether line clip 10 so as to cause the boat anchor line 16 of the boat 18 to be guided by the elongated slender cylindrical guiding portion 52 of the diver's tether line clip 10 and enter the retaining chamber 51 of the clip 10 where it is readily removably retained between the plurality of alternating serpentine retaining portion smooth valleys 50 of the serpentine retaining portion 46 and the elongated slender cylindrical shaft portion 32 due to the spring of the material of the diver's tether line clip 10.

The aforementioned positioning and removing operations of the diver's tether line clip 10 are continued at each of the desired depth intervals until the diver 12 has safely decompressed.

It will be understood that each of the elements described above, or two or more together, may also find a useful application in other types of constructions differing from the types described above.

While the invention has been illustrated and described as embodied in a Jon Line clip, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A diver's quick release tether line clip pivotally securable to a diver's tether line and removably securable to any size anchor line ranging from 0.5" to 1.5" of a boat so as to allow a diver to maintain a desired depth, comprising:

a) an elongated slender cylindrical shaft portion having a proximal end, a distal end, a diameter, and a longitudinal axis;

b) a cylindrical coil portion lying in a plane and being made from an elongated slender rod material having a diameter; said cylindrical coil portion extending smoothly from said proximal end of said elongated slender cylindrical shaft portion, to one side of, and tangential to, said elongated slender cylindrical shaft portion, and perpendicularly upwardly from said longitudinal axis of said elongated slender cylindrical shaft portion; said cylindrical coil portion including at least two concentric loops; each loop of said at least two concentric loops of said cylindrical coil portion being in contact with, and not spaced from, an adjacent loop of said at least two concentric loops of said cylindrical coil portion so as to allow an end of the diver's tether line to be passable therethrough and doubled back onto, and affixed to, itself so as to allow the diver's tether line to be pivotally connectable to said cylindrical coil portion, so that the diver's tether line is pivotally securable to said diver's quick release tether line clip;

c) a smooth semi-circular portion lying in a plane and being made from an elongated slender rod material having a diameter; said smooth semi-circular portion extending smoothly from said distal end of said elongated slender cylindrical shaft portion; said plane of said smooth semi-circular portion being perpendicular to said plane of said cylindrical coil portion; and d) a serpentine retaining portion lying in a plane and being made from an elongated slender rod material having a diameter; said plane of said serpentine retaining portion being perpendicular to said plane of said cylindrical coil portion; said serpentine retaining portion extending smoothly outwardly from said smooth semi-circular portion and lying to said one side of said elongated slender cylindrical shaft portion and together with said smooth semi-circular portion and said elongated slender cylindrical shaft portion defining a retaining chamber for having the any size anchor line ranging from 0.5" to 1.5" of the boat removably receivable therein, so that the any size anchor line ranging from 0.5" to 1.5" of the boat is removably receivable in said diver's quick release tether line clip; said serpentine retaining portion having a plurality of alternating hills and valleys; said plurality of valleys of said serpentine retaining portion normally being spaced from, and not contacting, said elongated slender cylindrical shaft portion so as to inherently accommodate the any size anchor line ranging from 0.5" to 1.5" of the boat therebetween and compress the any size anchor line ranging from 0.5" to 1.5" of the boat against said elongated slender cylindrical shaft portion for removable securement therebetween when the any size anchor line ranging from 0.5" to 1.5" of the boat is removably received therebetween, so that the any size anchor line ranging from 0.5" to 1.5" of the boat is removably securable in said diver's quick release tether line flip and the diver is maintainable at the desired depth.

2. The clip as defined in claim 1, wherein said elongated slender cylindrical shaft portion is spring stainless steel, so that said elongated slender cylindrical shaft portion is resilient and will not corrode in sea water.

3. The clip as defined in claim 1, wherein said cylindrical coil portion is spring stainless steel, so that said cylindrical coil portion is resilient and will not corrode in sea water.

4. The clip as defined in claim 1, wherein said diameter of said material of said cylindrical coil portion is equal to said diameter of said elongated slender cylindrical shaft portion.

5. The clip as defined in claim 1, wherein said cylindrical coil portion is integrally formed with said elongated slender cylindrical shaft portion.

6. The clip as defined in claim 5, wherein said smooth semi-circular portion is integrally formed with said elongated slender cylindrical shaft portion.

7. The clip as defined in claim 6, wherein said serpentine retaining portion is integrally formed with said smooth semi-circular portion.

8. The clip as defined in claim 1, wherein said smooth semi-circular portion is spring stainless steel, so that said smooth semi-circular portion is resilient and will not corrode in sea water.

9. The clip as defined in claim 1, wherein said diameter of said material of said smooth semi-circular portion is equal to said diameter of said elongated slender cylindrical shaft portion.

10. The clip as defined in claim 1, wherein said serpentine retaining portion is spring stainless steel, so that said serpentine retaining portion is resilient and will not corrode in sea water.

11. The clip as defined in claim 1, wherein said diameter of said material of said serpentine retaining portion is equal to said diameter of said elongated slender cylindrical shaft portion.

12. The clip as defined in claim 1; further comprising an elongated slender cylindrical guiding portion that lies in a plane and has diameter; said elongated slender cylindrical guiding portion extends smoothly outwardly at a skewed angle from said serpentine retaining portion and guiding the any size anchor line ranging from 0.5" to 1.5" of the boat into said retaining chamber when the any size anchor line ranging from 0.5" to 1.5" of the boat is removably received in said retaining chamber, so that the any size anchor line ranging from 0.5" to 1.5" of the boat is guidable into said retaining chamber.

13. The clip as defined in claim 12, wherein said elongated slender cylindrical guiding portion is spring stainless steel, so that said elongated slender cylindrical guiding portion is resilient and will not corrode in sea water.

14. The clip as defined in claim 12, wherein said diameter of said elongated slender cylindrical guiding portion is equal to said diameter of said elongated slender cylindrical shaft portion.

15. The clip as defined in claim 12, wherein said elongated slender cylindrical guiding portion is integrally formed with said serpentine retaining portion.

\* \* \* \* \*